UNITED STATES PATENT OFFICE.

JOHN BENJAMIN HANCOCK, OF BUDA, TEXAS.

POLISH FOR WOODWORK AND METHOD OF PREPARING THE SAME.

1,153,686.     Specification of Letters Patent.     Patented Sept. 14, 1915.

No Drawing.     Application filed January 22, 1913. Serial No. 743,631.

*To all whom it may concern:*

Be it known that I, JOHN BENJAMIN HANCOCK, a citizen of the United States, residing at Buda, in the county of Hays and State of Texas, have invented new and useful Improvements in Polish for Woodwork and Methods of Preparing the Same, of which the following is a specification.

My invention relates to a compound or mixture providing a polish for varnished woodwork, especially the varnished woodwork of furniture, that will effectively cleanse the same by removing spots and foreign matter therefrom and at the same time will produce a lustrous and glossy finish thereon.

The invention further relates to the method of preparing the polish.

The polish is composed of the substances and in the proportions given in the following formula:—

| | |
|---|---|
| Flour of pumice | $3\frac{1}{2}$ oz. by weight. |
| Water (rain) | 42 oz. by measure. |
| Whites of eggs | 14 oz. by measure. |
| Spirits of turpentine | $6\frac{1}{2}$ oz. by measure. |
| Gum camphor | $1\frac{1}{2}$ oz. by weight. |
| Oil of cassia | $1\frac{1}{2}$ oz. by weight. |
| Oil of cloves | $1\frac{1}{2}$ oz. by weight. |
| Oil of sassafras | $\frac{3}{4}$ oz. by weight. |
| Oil of rosemary | $\frac{3}{8}$ oz. by weight. |
| Oil of citronella | $\frac{3}{8}$ oz. by weight. |
| Petroleum oil (light and thin) | 12 oz. by measure. |
| Methylated spirits | 28 oz. by measure. |

In the preparation of the mixture ordinary powdered pumice is reduced to an absolute flour as by grinding or triturating the same by means of a pestle and mortar and then mixed with three or four ounces of the rain water in a suitable receptacle and shaken so that the substances will thoroughly mix. Then in a separate or second receptacle or container, is poured the spirits of turpentine and then added the gum camphor which is allowed to thoroughly dissolve in the spirits of turpentine. Thereupon the essential oils are added which should previously be mixed and shaken well together in a third receptacle such as a stock bottle. Such essential oils comprise oil of cassia, oil of cloves, oil of sassafras, oil of rosemary, and oil of citronella. This mixture of essential oils is then thoroughly mixed as by shaking the same and then is added the petroleum oil. The latter mixture is then shaken to thoroughly mix the ingredients. Said petroleum oil should be a light, thin, polishing oil, for instance, such as that known in the trade as "White Rose petroleum oil." The methylated spirits are thereupon added and again the mixture is shaken, necessarily vigorously. The vessel or receptacle containing the mixture is corked and set aside. In the meantime the whites of eggs are added to the remainder of the rain water in a separate or fourth vessel, and the mixture of these ingredients thoroughly stirred and afterward strained and squeezed as through a piece of cloth several times so that the albumen is separated from the membrane or fibrous substance of the egg. After the preparation of the foregoing mixture of water and whites of eggs, the same is added to the mixture of water and pumice flour; any foam which may form upon the mixtures through beating, stirring and straining being first removed, then the compound mixtures thoroughly shaken so as to mix the pumice flour with the albumen and water. Thereupon the mixture containing essential and other oils, is added to the water mixture.

In effecting the mixture, the oil mixture is thoroughly shaken and is then added to the water mixture at about eight or ten ounces at a time, and in order to prevent the separation of the substances, at each time that quantities of the oil mixture and water mixture are brought together, they should be shaken vigorously, for example for two or three minutes.

Each quantity of the oil mixture should be shaken thoroughly before being added to the water mixture and the mixtures brought together as quickly as possible.

After the mixtures have been finally mixed the same should be shaken vigorously about fifteen or twenty minutes in order that the contents be kept thoroughly mixed until the albumen becomes coagulated. Thereupon the molecules of the oil separate and the compound emulsifies.

After the final shaking referred to, the polish should be corked air-tight and set aside for three or four days. While thus set aside certain chemical reactions occur and impart to the mixture a creamy yellow color.

During the process of producing the polish, when the oil and water mixtures are being brought together and shaken, the receptacles should be corked as much as possible, and the polish produced be well corked when in their final containers awaiting use.

Having thus described my invention, what I claim and desire to secure by Letters Patent is:

1. Process for preparing a polish consisting in forming a mixture of 42 oz. by measure of water and 3½ oz. by weight of flour of pumice, then forming a second mixture of 1½ oz. by weight of gum camphor and 6½ oz. by measure of spirits of turpentine, adding essential oils to the second mixture, adding the second mixture to the first mixture, adding a mineral oil to the resultant product; then preparing a third mixture of 14 oz. by measure of a binder and water, and adding the third mixture to the mixture of the first and second mixtures, the ingredients being used substantially in the proportions described.

2. Process for preparing a polish consisting in forming a mixture of 42 oz. by measure of water and 3½ oz. by weight of flour of pumice, then forming a second mixture of 1½ oz. by weight of gum camphor and 6½ oz. by measure of spirits of turpentine, adding essential oils to the second mixture, adding the second mixture to the first mixture, adding 12 oz. by measure of petroleum oil to the mixture, adding 28 oz. by measure of methylated spirit to the mixture; then preparing a third mixture of 14 oz. by measure of whites of eggs and water and adding the third mixture to the mixture of the first and second mixtures, the ingredients being used substantially in the proportions described.

3. Process for preparing a polish consisting in forming a mixture of 42 oz. by measure of water and 3½ oz. by weight of flour of pumice, and then forming a second mixture of 1½ oz. by weight of gum camphor and 6½ oz. by measure of spirits of turpentine, adding essential oils including 1½ oz. by weight of oil of cassia, 1½ oz. by weight of oil of cloves, ⅜ of an oz. by weight of oil of rosemary, ⅜ of an oz. by weight of oil of citronella, and ¾ of an oz. by weight of oil of sassafras to the second mixture, adding the second mixture to the first mixture, adding 12 oz. by measure of petroleum oil and 28 oz. by measure of methylated spirit to the resultant mixture; then preparing a third mixture of 14 oz. by measure of whites of eggs and water and adding the third mixture to the mixture of the first and second mixtures, the ingredients being used substantially in the proportions described.

4. A polishing compound composed of flour of pumice 3½ oz. by weight, whites of eggs 14 oz. by measure, spirits of turpentine 6½ oz. by measure, gum camphor 1½ oz. by weight, oil of cassia 1½ oz. by weight, oil of cloves 1½ oz. by weight, oil of sassafras ¾ oz. by weight, oil of rosemary ⅜ oz. by weight, oil of citronella ⅜ oz. by weight, petroleum oil 12 oz. by measure, methylated spirits 28 oz. by measure and water 42 oz. by measure, in substantially the proportions specified.

JOHN BENJAMIN HANCOCK.

Witnesses:
 JNO. R. HOWE,
 WM. D. CARRINGTON.